(12) United States Patent
Liu

(10) Patent No.: US 10,832,158 B2
(45) Date of Patent: Nov. 10, 2020

(54) MUTUAL INFORMATION WITH ABSOLUTE DEPENDENCY FOR FEATURE SELECTION IN MACHINE LEARNING MODELS

(71) Applicant: Google LLC, Mountain View, CA (US)

(72) Inventor: Yifang Liu, Redwood City, CA (US)

(73) Assignee: Google LLC, Mountain View, CA (US)

( * ) Notice: Subject to any disclaimer, the term of this patent is extended or adjusted under 35 U.S.C. 154(b) by 1693 days.

(21) Appl. No.: 14/230,222

(22) Filed: Mar. 31, 2014

(65) Prior Publication Data

US 2015/0278703 A1 Oct. 1, 2015

(51) Int. Cl.
G06N 20/00 (2019.01)
G06N 7/00 (2006.01)

(52) U.S. Cl.
CPC ............. *G06N 20/00* (2019.01); *G06N 7/005* (2013.01)

(58) Field of Classification Search
CPC ................................ G06N 20/00; G06N 7/005
See application file for complete search history.

(56) References Cited

U.S. PATENT DOCUMENTS 7,007,001 B2  2/2006  Oliver et al.
8,073,803 B2  12/2011 Murdock et al.
(Continued)

FOREIGN PATENT DOCUMENTS

WO   2002/095534   11/2002

OTHER PUBLICATIONS

Guyon, Isabelle, and André Elisseeff. "An introduction to variable and feature selection." Journal of machine learning research Mar. 3, 2003: 1157-1182.*

(Continued)

*Primary Examiner* — Miranda M Huang
*Assistant Examiner* — Kevin W Figueroa
(74) *Attorney, Agent, or Firm* — Fish & Richardson P.C.

(57) ABSTRACT

Systems and techniques are provided for determining mutual information with absolute dependency for feature selection. Items may be received from a dataset. Each item may include two random variables. A first random variable may be associated with a first range of discrete values, and a second random variable may be associated with a second range of discrete values. Mutual information between the two random variables may be determined according to one of:

$$I(X, Y) = \sum_{x \in X} \sum_{y \in Y} \left| p(x, y) \cdot \log\left(\frac{p(x, y)}{p(x) \cdot p(y)}\right) \right|$$

and $$I(X, Y) = \sum_{x \in X} \sum_{y \in Y} \left| p(y) \cdot \log\left(\frac{p(x, y)}{p(x) \cdot p(y)}\right) \right|,$$

I(X,Y) may be the mutual information between X and Y, x may be a value for X, y may be a value for Y, p(x,y) may be a joint probability distribution function of x and y, p(x) may be a marginal probability distribution function of x, and p(y) may be a marginal probability distribution function of y. The mutual information may be used in a machine learning system to predict a value for one of the random variables for an item for which the value is unknown.

28 Claims, 3 Drawing Sheets

(56) References Cited

U.S. PATENT DOCUMENTS

| | | | |
|---|---|---|---|
| 8,639,596 B2 | 1/2014 | Chew | |
| 2011/0231338 A1* | 9/2011 | Cooper | G06Q 40/06 705/36 R |
| 2012/0027295 A1* | 2/2012 | Shao | G06F 17/30781 382/170 |
| 2012/0109758 A1 | 5/2012 | Murdock et al. | |
| 2013/0018968 A1* | 1/2013 | Pennacchiotti | G06Q 10/10 709/206 |

OTHER PUBLICATIONS

ECE534 2009, 2010 Retrieved from [https://web.archive.org/web/20100501000000*/http://www1.ece.uic.edu/~devroye/courses/ECE534/lectures/ch2.pdf] Sep. 1, 2016.*

Póczos, Barnabás, and Jeff G. Schneider. "Nonparametric Estimation of Conditional Information and Divergences." AISTATS. 2012.*

\* cited by examiner

MUTUAL INFORMATION WITH ABSOLUTE DEPENDENCY FOR FEATURE SELECTION IN MACHINE LEARNING MODELS

BACKGROUND

Mutual information may be used to determine the correlation between two random variables. A first variable, which can have any of a range of values, may represent a feature of an item of a particular item type, while a second variable, which can also have any of a range of values, may represent a label for the item. The mutual information between the first and second variables may be based on the co-occurrence of the different values for the first and second random variables among a number of items of the item type for which the values for the variables are already known. The mutual information may indicate how much information the first variable provides about the second variable for the item type, and may be used to evaluate items of the item type for which only one of the variables is known. The level of mutual information between the first and second variables may correspond to how dependent the variables are on each other. Mutual information equal to 0 may indicate that the two variables are independent, while higher levels of mutual information may indicate how useful the first variable (the feature) may be in determining the second variable (the label.) This may make mutual information useful in feature selection in machine learning models.

For example, for an account in an application system, the first variable may represent the feature of whether a particular application has been installed on a device associated with the account, and the second variable may represent a label for the account, for example, the gender of the account's owner. The first variable may have a range of two values, for example, "yes" and "no", indicating whether the application is installed, and the second variable may have a range of two values, "male" and "female", indicating the gender of the account's owner. Mutual information between the first and second variable may be determined based on the known values of both variables in a dataset that includes a number of accounts. If the mutual information between the variables is high, then for future accounts for which the gender of the account owner is not known, the presence or absence of the application represented by the first variable on a device associated with the account may provide a strong indication as to the gender of the account owner.

Mutual information between random variables X and Y may be determined according to $$I(X, Y) = \sum_{x \in X} \sum_{y \in Y} p(x, y) \cdot \log\left(\frac{p(x, y)}{p(x) \cdot p(y)}\right) \quad (1)$$

when X and Y have a range of discrete values, where x represents a value from the range of discrete values for the random variable X, y represents a value from the range of discrete values for the random variable Y, p(x,y) represents the joint probability distribution function of x and y, p(x) represents the marginal probability distribution function of x, and p(y) represents the marginal probability distribution function of y.

When X and Y are continuous, mutual information may be determined according to $$I(X, Y) = \int_Y \int_X f(x, y) \cdot \log\left(\frac{f(x, y)}{f(x) \cdot f(y)}\right) dx\, dy \quad (2)$$

where f(x,y) represents the joint probability density function of X and Y, f(x) represents the marginal probability density function of X, and f(y) represents the marginal probability density function of Y.

The log term used in determining mutual information, $$\log\left(\frac{p(x, y)}{p(x) \cdot p(y)}\right),$$

may capture the dependency between different values of x and y. The log term may have a positive or negative value. A positive value for a given x and y may indicate that the values of x and y co-occur more often than they would if x and y were independent. A negative value may indicate the values of x and y co-occur less often than they would if x and y were independent. Positive and negative values of the log term for different values of x and y may cancel each other out during the determination of I(X,Y), which may result in I(X,Y) not representing the true amount of mutual information between X and Y.

For example, X may include two values, x=1 and x=2, and Y may include two values, y=a and y=b. In a first case, the marginal probability for Y may be P(y=a)=0.36 and P(y=b)=0.64. The marginality probability for X may be P(x=1)=0.35 and P(x=2)=0.65. The joint probability distribution of X and Y may be P(y=a, x=1)=0.31, P(y=a, x=2)=0.05, P(y=b, x=1)=0.04, and P(y=b, x=2)=0.6. According to (1), the mutual information I(X,Y)=0.15320219422. Using a Naïve Bayes classifier, the simple classification accuracy may be 0.910.

In a second case, the marginal probability for X may be P(x=1)=0.388 and P(x=2)=0.612. The joint probability distribution of X and Y may be P(y=a, x=1)=0.328, P(y=a, x=2)=0.032, P(y=b, x=1)=0.06, and P(y=b, x=2)=0.58 According to (1), the mutual information I(X,Y)=0.15666606782. Using a Naïve Bayes classifier, the simple classification accuracy may be 0.908.

The first case may present a greater relation between X and Y than the second case, as the simple classification accuracy of the first case is 91%, while in the second case it's 90.8%. However, the mutual information values determined according to (1) provide a contradictory result, with the second case having more mutual information than the first case. The positive and negative values of the log term may cancel out in the first case, due to the slope of the log function around y=0, resulting in the value for mutual information for the first case being lower than it should be.

BRIEF SUMMARY

According to an embodiment of the disclosed subject matter, two items may be received from a dataset, where each item may include two random variables. A first of the two random variables may be associated with a first range of discrete values, and a second of the two random variables may be associated with a second range of discrete values. Mutual information between the two random variables may be determined according to at least one of:

$$I(X, Y) = \sum_{x \in X} \sum_{y \in Y} \left| p(x, y) \cdot \log\left(\frac{p(x, y)}{p(x) \cdot p(y)}\right) \right|$$

and $$I(X, Y) = \sum_{x \in X} \sum_{y \in Y} \left| p(y) \cdot \log\left(\frac{p(x, y)}{p(x) \cdot p(y)}\right) \right|,$$

where I(X,Y) may be the mutual information between the first random variable X and the second random variable Y, x may be a value from the range of discrete values for the random variable X, y may be a value from the range of values for the random variable Y, p(x,y) may be a joint probability distribution function of x and y, p(x) may be a marginal probability distribution function of x, and p(y) may be a marginal probability distribution function of y. The mutual information may be stored.

The first of the two random variables may be a feature of the item, and the second of the two random variables may be a label for the item. The mutual information may be used in a machine learning system to predict a value for at least one of the random variables for an item for which the value is unknown. The item may be an account in an application ecosystem, the first of the two random variables may be a feature of the account, and the second of the two random variables may be a label for the account. The feature of the account may be one of whether an application is installed on a device associated with the account and the number of times an application has been used by a device associated with the account, and the label may be one of the gender of the owner of the account and the age of the owner of the account.

Each of the two items may further include a third random variable associated with a third range of discrete values. Mutual information may be determined between the three random variables according to $$I(X, Y) = \sum_{z \in Z} \sum_{x \in X} \sum_{y \in Y} \left| p(y, z) \cdot \log\left(\frac{p(z) \cdot p(x, y, z)}{p(x, z) \cdot p(y, z)}\right) \right|,$$

where I(X,Y) may be the mutual information between the two random variables X and Y that is additional to the mutual information between the third random variable Z and the second random variable Y, z may be a value from the range of discrete values for the third random variable Z, p(z) may be the marginal distribution function of z, p(y,z) may be the joint probability distribution function of y and z, p(x,z) may be the joint probability distribution function of x and z, and p(x,y,z) may be the joint probability distribution function of x, y and z. The mutual information may be stored. The third random variable may be a feature of the item.

A dataset including items may be received. The items may include features and labels, each feature including a value from a range of discrete values associated with the feature and each label including a value from a range of discrete values associated with the label. One feature and one label may be common to at least two items in the dataset.

Mutual information between each of the labels and each of the features may be determined for the items in the dataset. The mutual information may be mutual information with absolute dependency, accuracy optimized mutual information with absolute dependency, or accuracy optimized adapted conditional mutual information with absolute dependency. The mutual information may be stored.

According to an embodiment of the disclosed subject matter, a means for receiving at least two items from a dataset, where each item may include two random variables, and where a first of the two random variables may be associated with a first range of discrete values, and a second of the two random variables may be associated with a second range of discrete values, a means for determining mutual information between the two random variables according to at least one of:

$$I(X, Y) = \sum_{x \in X} \sum_{y \in Y} \left| p(x, y) \cdot \log\left(\frac{p(x, y)}{p(x) \cdot p(y)}\right) \right|$$

and $$I(X, Y) = \sum_{x \in X} \sum_{y \in Y} \left| p(y) \cdot \log\left(\frac{p(x, y)}{p(x) \cdot p(y)}\right) \right|,$$

wherein I(X,Y) may be the mutual information between the first random variable X and the second random variable Y, x may be a value from the range of discrete values for the random variable X, y may be a value from the range of values for the random variable Y, p(x,y) may be a joint probability distribution function of x and y, p(x) may be a marginal probability distribution function of x, and p(y) may be a marginal probability distribution function of y, a means for storing the mutual information, a means for determining the mutual information between the three random variables according to $$I(X, Y) = \sum_{z \in Z} \sum_{x \in X} \sum_{y \in Y} \left| p(y, z) \cdot \log\left(\frac{p(z) \cdot p(x, y, z)}{p(x, z) \cdot p(y, z)}\right) \right|,$$

where I(X,Y) may be the mutual information between the two random variables X and Y that may be additional to the mutual information between the third random variable Z and the second random variable Y, z may be a value from the range of discrete values for the third random variable Z, p(z) may be the marginal distribution function of z, p(y,z) may be the joint probability distribution function of y and z, p(x,z) may be the joint probability distribution function of x and z, and p(x,y,z) may be the joint probability distribution function of x, y and z, a means for storing the mutual information, a means for receiving at least two items from a dataset, where each item may include two random variables, and where a first of the two random variables may be associated with a first continuous function and the second of the two random variables may be associated with a second continuous function, a means for determining mutual information between the two random variables according to at least one of:

$$I(X, Y) = \int_Y \int_X \left| f(x, y) \cdot \log\left(\frac{f(x, y)}{f(x) \cdot f(y)}\right) \right| dx\, dy$$

and $$I(X, Y) = \int_Y \int_X \left| f(x) \cdot \log\left(\frac{f(x, y)}{f(x) \cdot f(y)}\right) \right| dx\, dy,$$

where I(X,Y) may be the mutual information between the two random variables X and Y, x may be a value from the continuous function for the random variable X, y may be a value from the continuous function for the random variable Y, f(x,y) may be a joint probability density function of x and y, f(x) may be a marginal probability density function of x, and f(y) may be a marginal probability density function of y, a means for storing the mutual information, a means for determining the mutual information between the three random variables according to $$I(X, Y) = \int_Z \int_Y \int_X \left| f(y, z) \cdot \log\left(\frac{f(z) \cdot f(x, y, z)}{f(x, z) \cdot f(y, z)}\right) \right| dx\, dy,$$

where I(X,Y) may be the mutual information between the two random variables X and Y that is additional to the mutual information between the third random variable Z and the random variable Y, z may be a value from the continuous third random variable Z, f(z) may be the marginal density function of z, f(y,z) may be the joint probability density function of y and z, f(x,z) may be the joint probability density function of x and z, and f(x,y,z) may be the joint probability density function of x, y and z; and a means for storing the mutual information are included.

A means for receiving a dataset including items, where the items may include features and labels, each feature may include a value from a range of discrete values associated with the feature and each label may include a value from a range of discrete values associated with the label, and where at least one feature and one label are common to at least two items in the dataset, a means for determining mutual information between each of the labels and each of the features for the items in the dataset, where the mutual information may be at least one of mutual information with absolute dependency, accuracy optimized mutual information with absolute dependency, and accuracy optimized adapted conditional mutual information with absolute dependency, a means for storing the mutual information, and a means for selecting based on the determined mutual information at least one feature for use by a machine learning system in predicting a value for at least one label for an item are also included.

Systems and techniques disclosed herein may allow for the determination of mutual information with absolute dependency for feature selection in machine learning models. Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
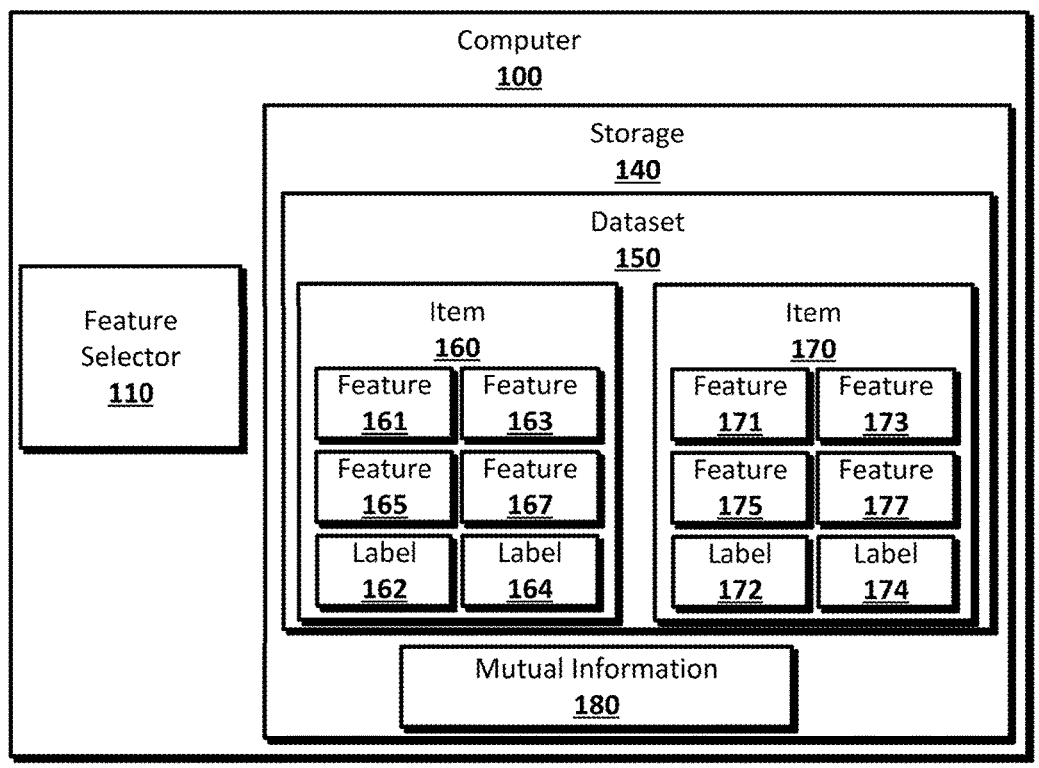
FIG. 1 shows an example system suitable for the determination of mutual information with absolute dependency for feature selection in machine learning models according to an implementation of the disclosed subject matter.

When using mutual information for feature selection, both positive and negative values of the log term may be useful as an indicator of the relationship between two random variables. Allowing both positive and negative values of the log term to contribute to the signal strength of the mutual information may result in the mutual information more accurately reflecting the correlation between the two random variables, and may result in better feature selection. In an implementation of the disclosed subject matter, the mutual information between two random variables, where a first variable may represent a feature of an item and a second variable may represent a label for the item, may be determined with absolute dependency. The value for mutual information with absolute dependency between two random variables may be an indicator of how useful a feature represented by the first random variable is in predicting a label represented by the second random variable for an item for which the label value may not be known. A high level of mutual information with absolute dependency between a feature and a label may indicate the feature is very useful for label selection for that label, and the feature may be selected for use in predicting the label for future items of the same type by, for example, a machine learning model.

The items used to determine mutual information with absolute dependency may be part of dataset. The dataset may include any number of items. Items in the dataset may have any number of associated features and labels, and the mutual information with absolute dependency may be determined for each combination of feature and label within the dataset, or only for a subset of selected features and labels. Not every item in the dataset may include every feature or label, as the dataset may be partially incomplete. The value of certain features for an item may be based on the absence of information in the item. For example, if the item is an account in an application system, and the feature is whether or not a particular application is installed on a device associated with the account, the absence of such an installation may give the feature its value even if the absence is not expressly included as data in the account and can only be determined by the omission of the application from a list of applications installed on devices associated with the account.

Whether a particular piece of information related to an item is a feature or a label may depend on the nature of the item and information available about the item, and the goal of performing feature selection on the item. For example, if the item is an account associated with an application ecosystem, the gender of the account owner may be a label if both gender is not generally known for accounts because users are not required to provide it and the goal of feature selection is to determine which features of the account may be useful to a machine learning model in predicting the gender of account owners. If the gender of the account owner is generally known for accounts, gender may be used as a feature. This can be used for any label of any item and is not limited to predicting gender of an account owner based on the association of a given application or group of applications with the account.

The mutual information with absolute dependency between two random variables may be determined based on the distribution of the different values for the variables within items in a dataset. For example, the items in a dataset may be accounts in an application ecosystem, a feature may be whether or not a particular application is installed on a device associated with the account, and a label may be a gender for the account owner. The distribution of the feature related to the particular application may be determined based on the number of accounts in the dataset that have an associated device with the application installed, and the number that do not. The distribution of the label may be determined based on the number of accounts in the dataset that belong to or otherwise correspond to a male and the number that belong or otherwise correspond to a female. The joint distribution of the feature for the particular application and label for gender may be determined for each unique combination of a possible values for the feature and label. A separate joint distribution may be determined based on each of the number of accounts in the dataset associated with a device having application installed and belonging to a male, the number of accounts associated with a device having the application installed and belonging to a female, the number of accounts belonging to a male where the application is not installed, and the number of accounts belonging to a female where the application is not installed.

Once the distributions of the two random variables are known within a dataset, mutual information with absolute dependency may be determined for the variables. Mutual information with absolute dependency may be determined according to $$I(X, Y) = \sum_{x \in X} \sum_{y \in Y} \left| p(x, y) \cdot \log\left(\frac{p(x, y)}{p(x) \cdot p(y)}\right) \right| \quad (3)$$

where X and Y have a range of discrete values, where x represents a value from the range of discrete values for the random variable X, y represents a value from the range of discrete values for the random variable Y, p(x,y) represents the joint probability distribution function of x and y, p(x) represents the marginal probability distribution function of x, and p(y) represents the marginal probability distribution function of y. For example, X may represent a feature of items in a dataset, such as whether or not a particular application is installed on a device associated with an account, and Y may represent a label for the items in the dataset, such as a the gender of the account owner. Each possible value for the feature X may be represented by x, for example, the application is installed, and the application is not installed, and each possible value for the label Y may be represented by y, for example, male and female.

When X and Y are continuous, mutual information with absolute dependency may be determined according to $$I(X, Y) = \int_Y \int_X \left| f(x, y) \cdot \log\left(\frac{f(x, y)}{f(x) \cdot f(y)}\right) \right| dxdy \quad (4)$$

where f(x,y) represents the joint probability density function of X and Y, f(x) represents the marginal probability density function of x, and f(y) represents the marginal probability density function of y.

The determination of mutual information with absolute dependency between two random variables may be optimized for accuracy, increasing prediction precision. Accuracy optimized mutual information with absolute dependency may be determined according to $$I(X, Y) = \sum_{x \in X} \sum_{y \in Y} \left| p(y) \cdot \log\left(\frac{p(x, y)}{p(x) \cdot p(y)}\right) \right| \quad (5)$$

when X and Y have a range of discrete values.

When X and Y are continuous, accuracy optimized mutual information with absolute dependency may be determined according to $$I(X, Y) = \int_Y \int_X \left| f(y) \cdot \log\left(\frac{f(x, y)}{f(x) \cdot f(y)}\right) \right| dxdy. \quad (6)$$

Using the marginal distribution or density function p(y) or f(y) in place of the joint distribution or density function p(x,y) or f(x,y) may increase the accuracy of the mutual information determination by shifting less joint probability to a smaller dominating joint probability than the joint probability shifted away from a larger dominating joint probability.

Accuracy optimized mutual information with absolute dependency may produce mutual information values more consistent with other forms of evaluation of relationships between variables, such as, for example, Naïve Bayes evaluation. For example, X may include two values, x=1 and x=2, and Y may include two values, y=a and y=b. In a first case, the marginal probability for Y may be P(y=a)=0.36 and P(y=b)=0.64. The marginality probability for X may be P(x=1)=0.35 and P(x=2)=0.65. The joint probability distribution of X and Y may be P(y=a, x=1)=0.31, P(y=a, x=2)=0.05, P(y=b, x=1)=0.04, and P(y=b, x=2)=0.6. According to (1), the mutual information I(X,Y)=0.15320219422. According to (5), the accuracy optimized mutual information with absolute dependency I(X,Y)=0.9627. Using a Naïve Bayes classifier, the simple classification accuracy may be 0.910.

In a second case, the marginal probability for X may be P(x=1)=0.388 and P(x=2)=0.612. The joint probability distribution of X and Y may be P(y=a, x=1)=0.328, P(y=a, x=2)=0.032, P(y=b, x=1)=0.06, and P(y=b, x=2)=0.58 According to (1), the mutual information I(X,Y)=0.15666606782. According to (5), the accuracy optimized mutual information with absolute dependency I(X,Y)=0.9390. Using a Naïve Bayes classifier, the simple classification accuracy may be 0.908.

While the mutual information determined according to (1) conflicts with the Naïve Bayes evaluation, as the first case has higher Naïve Bayes accuracy but lower mutual information than the second case, the accuracy optimized mutual information with absolute dependency determined according to (5) is consistent with the Naïve Bayes evaluation. The first case has both higher Naïve Bayes accuracy, and higher accuracy optimized mutual information with absolute dependency. Accuracy optimized mutual information with absolute dependency may be more useful in determining the relationship between random variables, for example, in order to select features from items that may be used to help predict labels for future items, than standard mutual information.

In some instances, multiple random variables may be correlated to another random variable. For example, multiple features may be correlated to a single label. It may be useful to determine how much total information about the label is provided by the multiple features. Some of the features may not be independent of one another, in which case simply summing the mutual information between each feature and the label may not provide an accurate value for total information. Adapted conditional mutual information with absolute dependency may be used to determine how much additional information a feature adds to a model for predicting the label. Accuracy optimized adapted conditional mutual information with absolute dependency may be determined according to $$I(X, Y) = \sum_{z \in Z} \sum_{x \in X} \sum_{y \in Y} \left| p(y, z) \cdot \log\left(\frac{p(z) \cdot p(x, y, z)}{p(x, z) \cdot p(y, z)}\right) \right| \quad (7)$$

when X and Y have a range of discrete values, where z represents a value from the range of discrete values for the random variable Z, x represents a value from the range of discrete values for the random variable X, y represents a value from the range of discrete values for the random variable Y, p(x) represents the marginal probability distribution function of x, p(y) represents the marginal probability distribution function of y, p(x,y) represents the joint probability distribution function of x and y, and p(x,y,z) represents the joint probability distribution function of x, y and z. The accuracy optimized adapted conditional mutual information with a absolute dependency, I(X,Y), represents how much additional information X provides over Z about Y. If the two random variables X and Z are highly correlated, X may not provide much more additional information about Y than is already provided by Z. For example, for an account in an application ecosystem, X may represent the feature of whether or not a first application is installed on a device associated with the account, and Z may represent the feature of whether or not a second application is installed, while Y may represent the label of the gender of the account owner. If the first application and the second application are highly correlated, for example, every account that has a device with the first application installed also has the second application installed, for example, due to the application's requiring one another to function, then the feature of whether or not the first application is installed may provide no additional information about the gender of the account owner over the feature of whether or not the second application is installed.

When X and Y are continuous, accuracy optimized mutual information with absolute dependency may be determined according to $$I(X, Y) = \int_Z \int_Y \int_X \left| f(y, z) \cdot \log\left(\frac{f(z) \cdot f(x, y, z)}{f(x, z) \cdot f(y, z)}\right) \right| dxdy \quad (8)$$

where f(y,z) represents the joint probability density function of Z and Y, f(x) represents the marginal probability density function of X, and f(y) represents the marginal probability density function of Y.

FIG. 1 shows an example system suitable for the determination of mutual information with absolute dependency for feature selection in machine learning models according to an implementation of the disclosed subject matter. A computer 100 may include a feature selector 110 and storage 140. The computer 100 may be any suitable device, such as, for example, a computer 20 as described in FIG. 4, for implementing the feature selector 110 and the storage 140. The computer 100 may be a single computing device, or may include multiple connected computing devices. The feature selector 110 may use dataset 150 to determine mutual information 180. The storage 140 may store the dataset 150, which may include items 160 and 170, in any suitable format.

The item 160 may include features 161, 163, 165, and 167, and labels 162 and 164. The item 170 may include features 171, 173, 175, and 177, and labels 172 and 174. The features 161, 163, 165, 167, 171, 173, 175, and 177 may be generic properties of the items 160 and 170 with specific known values for which values are also known for items of the same type as the items 160 and 170. The features 161 and 171 may represent a first property, the features 163 and 173 may represent a second property, the features 165 and 175 may represent a third property, and the features 167 and 177 may represent a fourth property. The value associated with the feature in an item may indicate the specific nature of the feature for the item. For example, if the items 160 and 170 are accounts associated with an application ecosystem, the features 161 and 171 may be the generic property of whether or not a particular application is installed on a device associated with the each account. The features 161 and 171 may have a value of "yes" or "no", depending on whether or not the particular application associated with the features 161 and 171 is installed on a device associated with the account of the item 160 or the item 170. The value of features, such as the feature 161, may not be stored explicitly, and may be determined implicitly by omission of data or by inclusion of data related to the feature. For example, the value for the feature 161 of the item 160 may be determined by the feature selector 110 based on whether the particular application associated with the feature 161 is found on a list of applications installed with devices associated with the account of the item 160.

The labels 162, 164, 172, and 174 may be generic properties of the items 160 and 170 with known values for which values may not be known for future items of same type as the items 160 and 170. The labels 162 and 172 may represent a first labeled property, and the labels 164 and 174 may represent a second labeled property. The value associated with the label of an item may indicate the nature of the label for the item. For example, if the items 160 and 170 are accounts associated with an application ecosystem, the labels 162 and 172 may be the gender of the account owner. The label 162 may have a value of "male" or "female." The values of the labels 162, 164, 172, and 174 for the items 160 and 170 may be known, and may be used in combination with the known values for the features 161, 163, 165, and 167, 171, 173, 175, 177, to develop a model for predicting labels for future items including features similar to the features 161, 163, 165, and 167, but having unknown values for labels similar to the labels 162 and 164.

The mutual information 180 may be, for example, mutual information values determined for the features and labels in the dataset 150. The mutual information 180 may include mutual information with absolute dependency, accuracy optimized mutual information with absolute dependency, and accuracy optimized adapted conditional mutual information with absolute dependency.

Figure 2:
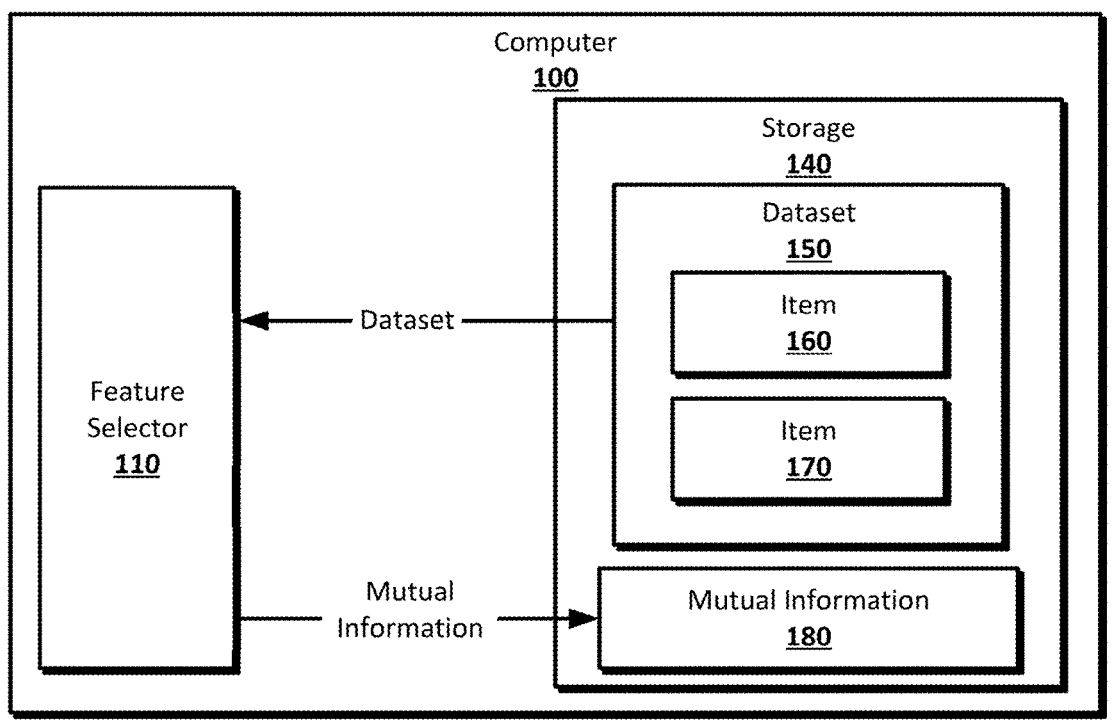
FIG. 2 shows an example arrangement for the determination of mutual information with absolute dependency for feature selection in machine learning models according to an implementation of the disclosed subject matter.

FIG. 2 shows an example arrangement for the determination of mutual information with absolute dependency for feature selection in machine learning models according to an implementation of the disclosed subject matter. Items may be gathered for the dataset 150. The dataset 150 may include data on items, such as the items 160 and 170, of the same or similar type, such as, for example, accounts in an application ecosystem. The items gathered in the dataset 150 may include features, such as the features 161, 163, 165, and 167, and labels, such as the labels 162 and 164, with known values. The dataset 150 may be stored in the storage 140.

The feature selector 110 may determine the mutual information 180 from any available features and labels in the dataset 150. For example, the marginal distributions of the values for the features 161, 163, 165, 167, 171, 173, 175, and 177, the values of the labels 162, 164, 172, and 174, and joint distribution between the values for the features and the values for the labels, may be determined. The distributions may be combined by the features selector 110 according to (3), (5), or (7) to determine mutual information between each of the features 161, 163, 165, 167, 171, 173, 175, and 177 and the labels 162, 164, 172, and 174, if the possible values for the features and labels are discrete, and according to (4), (6) and (8), if the possible values are continuous.

The feature selector 110 may use the mutual information 180 to determine which of the features representing a property, for example, the features 161 and 171, may be useful in a machine learning model for predicting labels representing a single property, for example, the labels 162 and 172. For example, if there is a high level of mutual information between the features 161 and 171, representing whether or not a particular application is installed on a device associated with a account, and the labels 162 and 172, representing the gender of the account owner, the feature selector 110 may determine that the features 161 and 171 may be used in a machine learning model to predict the gender on accounts of the same type as the items 160 and 170 for which the gender of the account owner is unknown.

Figure 3:
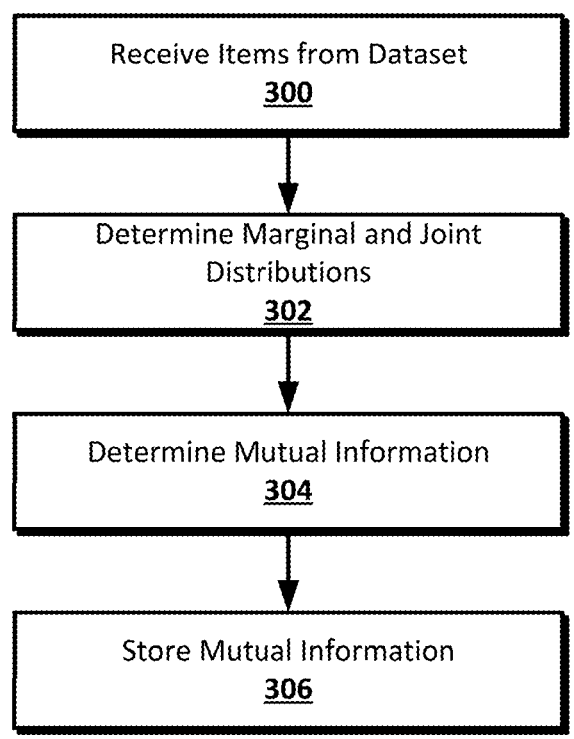
FIG. 3 shows an example process for determining mutual information with absolute dependency according to an implementation of the disclosed subject matter.

FIG. 3 shows an example process for determining mutual information with absolute dependency according to an implementation of the disclosed subject matter. At 300, the available items from a dataset may be received. For example, the features selector 110 may receive the items 160 and 170 available in the dataset 150. The items in the dataset 150 may have been gathered in any suitable manner and stored in the storage 140.

At 302, the joint and marginal distributions for values for random variables in the dataset may be determined. For example, the features selector 110 may determine the joint and marginal distributions for discrete values for the 161, 163, 165, 167, 171, 173, 175, and 177 and the labels 162, 164, 172, and 174 for the items 160 and 170 by counting occurrences of individual values and co-occurrences of values. The feature selector 110 may determine distribution functions if the values are continuous.

At 304, the mutual information between random variables in the dataset may be determined. For example, the feature selector 110 may determine mutual information between each of the features 161, 163, 165, 167, 171, 173, 175, and 177 and each of the labels 162, 164, 172, and 174, or any subset thereof, for the items 160 and 170. The mutual information may be determined as any of mutual information with absolute dependency according to (3) or (4), accuracy optimized mutual information with absolute dependency according to (5) or (6), and accuracy optimized adapted conditional mutual information with absolute dependency according to (7) or (8).

At 306, the mutual information may be stored. For example, the feature selector 110 may store the mutual information 180 in the storage 140. The mutual information 180 may be stored in any suitable format. The mutual information 180 may be accessed by, for example, the feature selector 110, or other machine learning system using any suitable machine learning model, to assess the relationships between random variables from the dataset 150. For example, the mutual information 180 may be used to determine which of the features 161, 163, 165, 167, 171, 173, 175, and 177 may be used to help predict values of the labels 162, 164, 172, and 174 for future items of the same type as the items 160 and 170 when the values are unknown.

Figure 4:
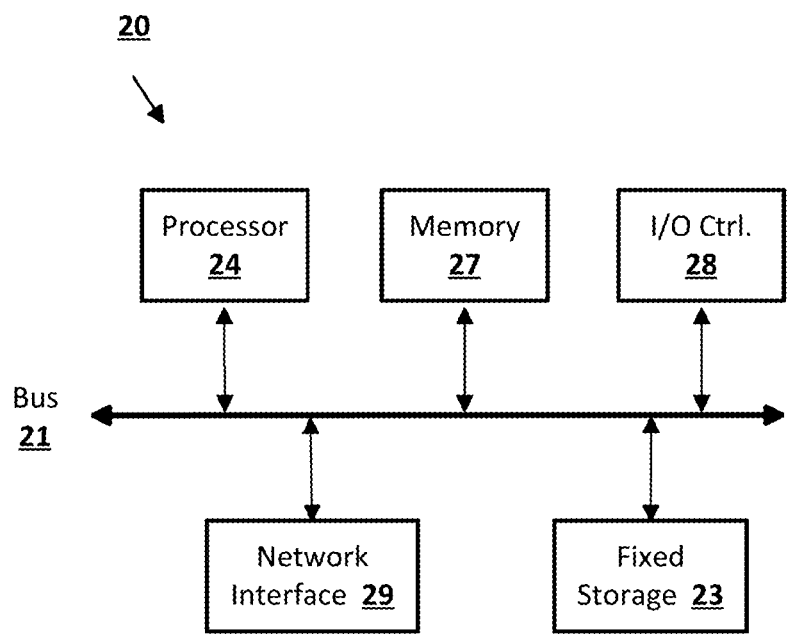
FIG. 4 shows a computer according to an embodiment of the disclosed subject matter.

Embodiments of the presently disclosed subject matter may be implemented in and used with a variety of component and network architectures. FIG. 4 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 5.

Many other devices or components (not shown) may be connected in a similar manner, such as document scanners, digital cameras, auxiliary, supplemental, or backup systems, or the like. Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 5:
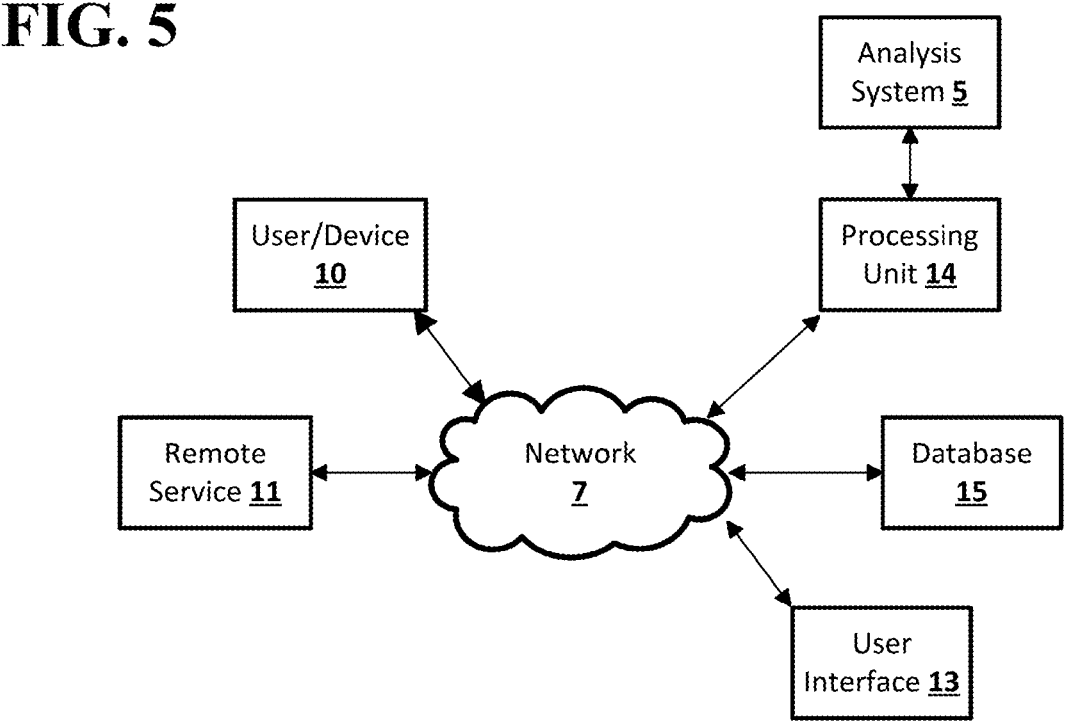
FIG. 5 shows a network configuration according to an embodiment of the disclosed subject matter.

FIG. 5 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by one or more computers of a machine learning system, the method comprising:

receiving, by the one or more computers of the machine learning system, a dataset comprising multiple items of a same type, wherein each item has multiple properties;

determining, for each of multiple iterations, a value representing mutual information between a first property and a second property, wherein, for each iteration, determining the value comprises:

selecting, by the one or more computers of the machine learning system, one of the multiple properties as the first property and another of the multiple properties as the second property; and determining, by the one or more computers of the machine learning system, the value representing the mutual information between the first property and the second property that are selected for the iteration, wherein the value representing the mutual information is generated using a summation of terms that are generated using logarithm values, and wherein the values of the terms are generated using an absolute value operation that disallows negative logarithm values from decreasing the summation;

based on the determined values representing mutual information between the selected properties from the multiple properties, selecting, by the one or more computers of the machine learning system, a subset of the multiple properties for use in the machine learning system;

receiving, by the one or more computers of the machine learning system, another item of the same type as the multiple items from the dataset, wherein the other item has a known value for at least one of the subset of properties;

predicting, by the one or more computers of the machine learning system, a value for a property of the other item having an unknown value, wherein the value is predicted using a machine learning model of the machine learning system based on the known value for the at least one of the subset of properties; and providing, by the one or more computers of the machine learning system, the predicted value over a network to a client device for display on a user interface of the client device.

2. The computer-implemented method of claim 1, wherein providing the predicted value comprises providing the predicted value for display in a web page at the client device.

3. The computer-implemented method of claim 1, wherein the first property and second property are discrete variables.

4. The computer-implemented method of claim 3, wherein determining the value representing mutual information between the first property and the second property further comprises determining, by the one or more computers of the machine learning system, a first distribution of a first set of values for the first property within the dataset, a second distribution of a second set of values for the second property within the dataset, and a joint distribution for the combination of the first set of values and the second set of values, and wherein the value of each term in the summation is determined as a result of dividing (i) a value of a joint probability distribution function determined according to the joint distribution by (ii) a product of values of a marginal probability distribution function determined according to the first distribution and the second distribution respectively.

5. The computer-implemented method of claim 4, wherein the value representing the mutual information between the first property and the second property is determined according to:

$$I(X, Y) = \sum_{x \in X} \sum_{y \in Y} \left| p(x, y) \cdot \log\left(\frac{p(x, y)}{p(x) \cdot p(y)}\right) \right|,$$

wherein I(X, Y) is the mutual information between the first property represented by X and the second property represented by Y, x is a value from a range of discrete values for X, y is a value from a range of discrete values for Y, p(x,y) is a joint probability distribution function of x and y, p(x) is a marginal probability distribution function of x, and p(y) is a marginal probability distribution function of y.

6. The computer-implemented method of claim 4, wherein the value representing the mutual information between the first property and the second property is determined according to:

$$I(X, Y) = \sum_{x \in X} \sum_{y \in Y} \left| p(y) \cdot \log\left(\frac{p(x, y)}{p(x) \cdot p(y)}\right) \right|,$$

wherein I(X, Y) is the mutual information between the first property represented by X and the second property represented by Y, x is a value from a range of discrete values for X, y is a value from a range of discrete values for Y, p(x,y) is a joint probability distribution function of x and y, p(x) is a marginal probability distribution function of x, and p(y) is a marginal probability distribution function of y.

7. The computer-implemented method claim 3, wherein each of the multiple items comprises at least a third property, and wherein the value representing the mutual information between the first property and the second property is determined according to:

$$I(X, Y) = \sum_{z \in Z} \sum_{x \in X} \sum_{y \in Y} \left| p(y, z) \cdot \log\left(\frac{p(z) \cdot p(x, y, z)}{p(x, z) \cdot p(y, z)}\right) \right|,$$

wherein I(X, Y) is the mutual information between the first property represented by X and the second property represented by Y, that is additional to mutual information between Y and a third property of selected from the multiple items represented by Z, x is a value from a range of discrete values for X, y is a value from a range of discrete values for Y, z is a value from a range of discrete values for Z, p(z) is a marginal distribution function of z, p(y,z) is a joint probability distribution function of y and z, p(x,z) is a joint probability distribution function of x and z, and p(x,y,z) is a joint probability distribution function of x, y and z.

8. The computer-implemented method of claim 1, wherein the first property and second property are continuous variables.

9. The computer-implemented method of claim 8,
wherein determining the value representing mutual information between the first property and the second property further comprises determining, by the one or more computers of the machine learning system, a first distribution of a first set of values for the first property within the dataset, a second distribution of a second set of values for the second property within the dataset, and a joint distribution for the combination of the first set of values and the second set of values, and
wherein the value of each term in the summation is determined as a result of dividing (i) a value of a joint probability density function determined according to the joint distribution by (ii) a product of values of a marginal probability density function determined according to the first distribution and the second distribution respectively.

10. The computer-implemented method of claim 9, wherein the value representing the mutual information between the first property and the second property is determined according to:

$$I(X, Y) = \int_Y \int_X \left| f(x, y) \cdot \log\left(\frac{f(x, y)}{f(x) \cdot f(y)}\right) \right| dxdy,$$

wherein I(X, Y) is the mutual information between the first property represented by X and the second property represented by Y, x is a value from a range of continuous values for X, y is a value from a range of continuous values for Y, f(x,y) is a joint probability density function of x and y, f(x) is a marginal probability density function of x, and f(y) is a marginal probability density function of y.

11. The computer-implemented method of claim 9, wherein the value representing the mutual information between the first property and the second property is determined according to:

$$I(X, Y) = \int_Y \int_X \left| f(y) \cdot \log\left(\frac{f(x, y)}{f(x) \cdot f(y)}\right) \right| dxdy$$

wherein I(X, Y) is the mutual information between the first property represented by X and the second property represented by Y, x is a value from a range of continuous values for X, y is a value from a range of continuous values for Y, f(x, y) is a joint probability density function of x and y, f(x) is a marginal probability density function of x, and f(y) is a marginal probability density function of y.

12. The computer-implemented method claim 8, wherein each of the multiple items comprises at least a third property, and wherein the value representing the mutual information between the first property and the second property is determined according to:

$$I(X, Y) = \int_Z \int_Y \int_X \left| f(y, z) \cdot \log\left(\frac{f(z) \cdot f(x, y, z)}{f(x, z) \cdot f(y, z)}\right) \right| dxdy,$$

wherein I(X, Y) is the mutual information between the first property represented by X and the second property represented by Y, that is additional to mutual information between Y and a third property selected from the multiple items represented by Z, x is a value from a range of continuous values for X, y is a value from the range of continuous values for Y, z is a value from a range of continuous values for Z, f(z) is a marginal probability density function of z, f(y,z) is a joint probability density function of y and z, f(x,z) is a joint probability density function of x and z, and f(x,y,z) is a joint probability density function of x, y, and z.

13. The computer-implemented method of claim 1, wherein the method comprises performing a number of iterations determined based on a number of possible combinations of the multiple properties.

14. The computer-implemented method of claim 1, wherein values for the multiple properties may be null.

15. The computer-implemented method of claim 1, wherein the known value for at least one of the subset of properties of the other item is determined implicitly by an omission of information.

16. The computer-implemented method of claim 1, wherein the known value for the at least one of the subset of properties of the other item is determined based on an inclusion of information related to the at least one of the subset of properties.

17. The computer-implemented method of claim 1 further comprising storing the determined values representing mutual information between the selected properties from the multiple properties.

18. The method of claim 1, wherein determining, for each of multiple iterations, a value representing mutual information between a first property and a second property comprises:
   determining, for each of the multiple iterations, a value representing mutual information between a property of the multiple properties and a particular classification, each of the iterations determining a value representing mutual information between a different one of the multiple properties and the particular classification, wherein determining the value comprises:
      selecting, by the one or more computers of the machine learning system, one of the multiple properties as the first property and the particular classification label as the second property; and
      determining, by the one or more computers of the machine learning system, the value representing the mutual information between (i) the first property selected for the iteration and (ii) the particular classification, wherein the value representing the mutual information is generated using a summation of terms that are generated using logarithm values, and wherein the values of the terms are generated using an absolute value operation that disallows negative logarithm values from decreasing the summation;
   wherein selecting the subset of the multiple properties comprises selecting a combination of properties, from among the multiple properties, as features for prediction of the particular classification based on the determined values representing mutual information between the different selected first properties and the particular classification;
   wherein predicting the value for the property of the other item comprises predicting, for the other item, a classification label for the particular classification using the machine learning model and values, for the other item, for the combination of properties selected as features; and
   wherein providing the predicted value over a network to a client device for display on a user interface of the client device comprises providing the predicted classification label for display on the user interface of the client device.

19. A system comprising:
   one or more computers; and
   one or more computer-readable storage devices storing instructions that, when executed by the one or more computers, cause the one or more computers to perform operations comprising:
      receiving, by the one or more computers, a dataset comprising multiple items of a same type, wherein each item has multiple properties;
      determining, for each of multiple iterations, a value representing mutual information between a first property and a second property, wherein, for each iteration, determining the value comprises:
         selecting, by the one or more computers, one of the multiple properties as the first property and another of the multiple properties as the second property; and
         determining, by the one or more computers, the value representing the mutual information between the first property and the second property that are selected for the iteration, wherein the value representing the mutual information is generated using a summation of terms that are generated using logarithm values, and wherein the values of the terms are generated using an absolute value operation that disallows negative logarithm values from decreasing the summation;
      based on the determined values representing mutual information between the selected properties from the multiple properties, selecting, by the one or more computers of the system, a subset of the multiple properties for use with a machine learning model;
      receiving, by the one or more computers, another item of the same type as the multiple items from the dataset, wherein the other item has a known value for at least one of the subset of properties;
      predicting, by the one or more computers, a value for a property of the other item having an unknown value, wherein the value is predicted using the machine learning model based on the known value for the at least one of the subset of properties; and
      providing, by the one or more computers, the predicted value over a network to a client device for display on a user interface of the client device.

20. The system of claim 19, wherein providing the predicted value comprises providing the predicted value for display in a web page at the client device.

21. The system of claim 19, wherein the first property and second property are discrete variables.

22. The system of claim 21,
   wherein determining the value representing mutual information between the first property and the second property further comprises determining, by the one or more computers of the system, a first distribution of a first set of values for the first property within the dataset, a second distribution of a second set of values for the second property within the dataset, and a joint distribution for the combination of the first set of values and the second set of values, and
   wherein the value of each term in the summation is determined as a result of dividing (i) a value of a joint probability distribution function determined according to the joint distribution by (ii) a product of values of a marginal probability distribution function determined according to the first distribution and the second distribution respectively.

23. The system of claim 19, wherein the first property and second property are continuous variables.

24. The system of claim 23,
   wherein determining the value representing mutual information between the first property and the second property further comprises determining, by the one or more computers of the system, a first distribution of a first set of values for the first property within the dataset, a second distribution of a second set of values for the second property within the dataset, and a joint distribution for the combination of the first set of values and the second set of values, and
   wherein the value of each term in the summation is determined as a result of dividing (i) a value of a joint probability density function determined according to the joint distribution by (ii) a product of values of a marginal probability density function determined according to the first distribution and the second distribution respectively.

25. The system of claim 19, wherein the operations include performing a number of iterations determined based on a number of possible combinations of the multiple properties.

26. The system of claim 19, wherein the known value for at least one of the subset of properties of the other item is determined implicitly by an omission of information.

27. The system of claim 19, wherein the known value for the at least one of the subset of properties of the other item is determined based on an inclusion of information related to the at least one of the subset of properties.

28. One or more non-transitory computer-readable media storing instructions that, when executed by one or more computers of a machine learning system, cause the one or more computers to perform operations comprising:
- receiving, by the one or more computers of the machine learning system, a dataset comprising multiple items of a same type, wherein each item has multiple properties;
- determining, for each of multiple iterations, a value representing mutual information between a first property and a second property, wherein, for each iteration, determining the value comprises:
  - selecting, by the one or more computers of the machine learning system, one of the multiple properties as the first property and another of the multiple properties as the second property; and
  - determining, by the one or more computers of the machine learning system, the value representing the mutual information between the first property and the second property that are selected for the iteration, wherein the value representing the mutual information is generated using a summation of terms that are generated using logarithm values, and wherein the values of the terms are generated using an absolute value operation that disallows negative logarithm values from decreasing the summation;
- based on the determined values representing mutual information between the selected properties from the multiple properties, selecting, by the one or more computers of the machine learning system, a subset of the multiple properties for use in the machine learning system;
- receiving, by the one or more computers of the machine learning system, another item of the same type as the multiple items from the dataset, wherein the other item has a known value for at least one of the subset of properties;
- predicting, by the one or more computers of the machine learning system, a value for a property of the other item having an unknown value, wherein the value is predicted using a machine learning model of the machine learning system based on the known value for the at least one of the subset of properties; and
- providing, by the one or more computers of the machine learning system, the predicted value over a network to a client device for display on a user interface of the client device.

* * * * *